US010239115B2

(12) United States Patent
Hornbostel et al.

(10) Patent No.: US 10,239,115 B2
(45) Date of Patent: Mar. 26, 2019

(54) METHOD FOR JOINING AT LEAST TWO PARTS TO BE JOINED WHICH ARE ARRANGED SO AS TO OVERLAP AT LEAST IN A JOINING ZONE USING A JOINING ELEMENT

(71) Applicant: AUDI AG, Ingolstadt (DE)

(72) Inventors: Norbert Hornbostel, Talheim (DE); Frank Barkhausen, Lichtenau (DE); Heiko Hellmeier, Heilbronn (DE)

(73) Assignee: AUDI AG, Ingolstadt (DE)

( * ) Notice: Subject to any disclaimer, the term of this patent is extended or adjusted under 35 U.S.C. 154(b) by 253 days.

(21) Appl. No.: 15/112,075

(22) PCT Filed: Nov. 27, 2014

(86) PCT No.: PCT/EP2014/003182
§ 371 (c)(1),
(2) Date: Jul. 15, 2016

(87) PCT Pub. No.: WO2015/106780
PCT Pub. Date: Jul. 23, 2015

(65) Prior Publication Data
US 2016/0332214 A1 Nov. 17, 2016

(30) Foreign Application Priority Data
Jan. 18, 2014 (DE) .......................... 10 2014 000 624

(51) Int. Cl.
F16B 19/06 (2006.01)
B21J 15/02 (2006.01)
(Continued)

(52) U.S. Cl.
CPC ........... B21J 15/025 (2013.01); B29C 65/601 (2013.01); B29C 66/1122 (2013.01);
(Continued)

(58) Field of Classification Search
CPC ............. F16B 19/086; Y10T 29/49622; Y10T 29/49629; Y10T 29/49634;
(Continued)

(56) References Cited

U.S. PATENT DOCUMENTS 7,267,736 B2 * 9/2007 Hou .................... B23K 11/0066
156/272.2
2008/0149256 A1 * 6/2008 Wang ..................... B21J 15/025
156/92

(Continued)

FOREIGN PATENT DOCUMENTS

CN 1078672 11/1993
CN 102483084 5/2012
(Continued)

OTHER PUBLICATIONS

Hanwu CN 2530751 English Translation.*
(Continued)

Primary Examiner — Jason L Vaughan
Assistant Examiner — Amanda J Meneghini
(74) Attorney, Agent, or Firm — Henry M. Feiereisen LLC

(57) ABSTRACT

A method for joining at least two parts to be joined which are arranged so as to overlap at least in a joining zone is disclosed using a joining element which is fed to the joining zone in a joining direction and which is designed so as to be free of undercuts at least in a shaft when seen opposite the joining direction. At least one first part to be joined that interacts first with the joining element in the joining direction, is punched by means of the joining element, and the joining element is pressed into a second part to be joined without punching through the second part. The shaft of the joining element is designed so as to be free of undercuts after being pressed into the second part to be joined and is (Continued)

arranged so as to contact the first and the second part to be joined with a radially applied force in a form-fit-free manner at least when seen opposite the joining direction.

20 Claims, 3 Drawing Sheets

(51) Int. Cl.
    *F16B 19/08* (2006.01)
    *B29C 65/60* (2006.01)
    *B29C 65/00* (2006.01)
    *F16B 5/04* (2006.01)
    *B29L 9/00* (2006.01)

(52) U.S. Cl.
    CPC ............ *F16B 19/06* (2013.01); *F16B 19/086* (2013.01); *B29L 2009/00* (2013.01); *F16B 5/04* (2013.01)

(58) Field of Classification Search
    CPC ......... Y10T 29/49943; Y10T 29/49956; Y10T 29/49954; Y10T 29/49957; B21J 15/025; B23P 2700/00; B23P 2700/50
    See application file for complete search history.

(56) References Cited

U.S. PATENT DOCUMENTS

2010/0083481 A1\* 4/2010 Luo .................. B21J 15/025
                                        29/432
2014/0331478 A1\* 11/2014 Dannheisig ......... B29C 65/64
                                        29/525.07

FOREIGN PATENT DOCUMENTS

| | | |
|---|---|---|
| CN | 02728766 | 10/2012 |
| DE | 103 29 447 A1 | 2/2005 |
| DE | 10 2008 005 289 A1 | 7/2009 |
| DE | 10 2011 009 649 A1 | 7/2011 |
| DE | 10 2010 000 500 | 2/2012 |
| GB | 2428077 A \* | 1/2007 ............ B21J 15/025 |
| GB | 2 428 077 | 8/2008 |
| TW | 200641261 | 12/2006 |

OTHER PUBLICATIONS

Chinese Search Report dated Mar. 24, 2017 with respect to counterpart Chinese patent application 201480073026.7.
Translation of Chinese Search Report dated Mar. 24, 2017 with respect to counterpart Chinese patent application 201480073026.7.
International Search Report issued by the European Patent Office in International Application PCT/EP2014/003182.

\* cited by examiner

METHOD FOR JOINING AT LEAST TWO PARTS TO BE JOINED WHICH ARE ARRANGED SO AS TO OVERLAP AT LEAST IN A JOINING ZONE USING A JOINING ELEMENT

CROSS-REFERENCES TO RELATED APPLICATIONS

This application is the U.S. National Stage of International Application No. PCT/EP2014/003182, filed Nov. 27, 2014, which designated the United States and has been published as International Publication No. WO 2015/106780 and which claims the priority of German Patent Application, Serial No. 10 2014 000 624.7, filed Jan. 18, 2014, pursuant to 35 U.S.C. 119(a)-(d).

BACKGROUND OF THE INVENTION

The invention relates to a method for joining at least two parts to be joined that are arranged so as to overlap at least in a joining zone using a joining element according to the preamble of claim 1.

From DE 103 29 447 A1 a joining method for joining parts that are to be joined and are arranged so as to overlap each other is known which uses a joining element having a shaft region that is free of undercuts. In this disclosed joining method material of a first joining part is urged during the joining process through a punch recess of the second joining part, which recess is generated during the joining method, wherein an undesired punch piece is generated. After urging material of the first joining part through the generated punch opening of the second joining part the material of the first joining part is compressed relative to the second joining part so that a form fit is generated is between the first and second joining part. A disadvantage of this method is that an undesired slug is generated that has to be reliably removed from the joining site. In addition uncoated border regions are generated when urging the first material through the just generated punch opening in the second joining part, which may lead to undesired corrosion.

In DE 10 2011 009 649 A1 the method generally known as solid punch riveting is disclosed. In such a method the used joining element has at least in the shaft region undercuts or grooves and indentations that extend in circumferential direction and into which material is pressed with a die so as to ensure that the solid rivet is form-fittingly seated in the material of the two joining parts.

A disadvantage of such a so-called solid punch riveting is that at least one, or even two slugs of the two joining parts are generated. In particular when the joining parts are made of different materials, two slugs are particularly disadvantageous because after joining with the solid rivet they have to be separated again according to material to be recycled.

From DE 10 2008 005 289 a fastening arrangement of a superstructure component, in particular of a roof element for a vehicle roof on a body of a motor vehicle, is known. In this fastening arrangement joining or fastening is accomplished by the solid punch riveting process, in which two slugs are generated during introduction of the solid rivet into the components to be joined. A disadvantage in this method is that slugs are produced, which involves increased disposal costs.

It is an object of the invention to avoid the disadvantages of the state of the art. It is another object of the invention to provide a joining method which uses a joining element and which minimizes corrosion sensitivity in the region of the joining sites.

A further object of the invention is to provide a joining method in which no free slugs are produced that have to be disposed.

A further object of the invention is to provide a joining method with a simple formed joining element, which has sufficient removal strengths or removal forces.

SUMMARY OF THE INVENTION

It is a further object of the invention to provide a punch rivet joining method which can also be used within a narrow joining zone, in particular in a region of a vehicle body flange with a flange length of 12 mm or less.

These objects are solved with a joining method with the features of claim 1. Advantageous embodiments are set forth in the dependent claims.

A method for joining at least two joining parts, which overlap at least in a joining zone, by using a joining element which is supplied to the joining zone in a joining direction F and is configured to be free of undercuts at least in a shaft region viewed in a direction opposite the joining direction F, is refined according to the invention in that by means of the joining element at least one first joining part is punched through, which first interacts with the joining element and the joining element pushes a second joining part into the second joining part without pushing through the second joining part, wherein the shaft region of the joining element after the pushing into the second joining part is arranged so as to contact the first and second joining part so as to be impinged with a force without undercut and at least in joining direction F in the absence of a form fit.

In such a method according to the invention it is particularly advantageous that no undesired slugs are generated. In particular the slug generated during punching through the first joining part by means of the joining element is displaced into a region of the second joining part where it is embedded. The joining element remains substantially undeformed during the joining method according to the invention and, in contrast to the semi solid punch riveting method is not intended to expand. This allows keeping the joining zone particularly small, which enables using punches and dies or down holders with small diameters so that the joining method according to the invention can also be used in the region of small overlap zones, in particular in the region of small vehicle body flanges. It is surprising that during the joining method according to the invention the perforation of the first joining part and the introduction of the joining element into the second joining part along the form direction F results in radial forces acting on the shaft of the joining element so that sufficient removal forces can be achieved, which are for example required for a connection of vehicle body parts by means of riveting. In the method according to the invention a form fit is intentionally avoided and the pressing of the undercut-free joining element results in a pure force fit and/or friction fit between the joining parts and the joining element at the contacting surfaces, wherein the pullout forces generated thereby to pull the joining element out of the joining parts reaches a sufficient level.

In an embodiment of the method according to the invention, a slug that is generated when punching through the first joining part is embedded between a terminal free end of the joining element and the non-punched through second joining part. As a result the slug generated during punching through the first joining part remains in the joining connections between the joining parts to be joined. Thus no waste in the form of a slug that has to be removed and/or disposed from the joining station at which the method according to the invention is performed.

For the method according to the invention, joining elements can be used which have a shaft region and a joining part head, wherein the shaft region is configured undercut-free when viewed in the intended joining direction and is circular, oval, triangular multiangular or polygonal. For example the shaft region of the joining element may taper toward its free end.

The joining element used according to the invention is configured so that it remains unchanged or almost unchanged during the joining process regarding its three dimensional shape. The term "unchanged" or "almost unchanged" means hereby that when the joining element is urged in of course scores or grooves may form on the outer sides of the joining element. The three-dimensional shape of the joining element however remains substantially the same. An example of a situation in which the three-dimensional shape of the joining element does not remain the same is the hollow punch rivet method in which a defined deformation of the semi solid punch rivet is required and intended for forming an undercut in the joining connection. In contrast an appropriate joining element for the joining method according to the invention is a solid body which during the joining retains its three-dimensional shape.

It has been shown that a sufficient strength of the joining site can be achieved when the joining element in the region of the shaft outer surface has a roughness of $R_a \leq 10$ μm. Already in such a surface roughness, sufficient frictional forces are generated by the radial forces occurring during the joining on the shaft outer surfaces of the joining element, which radial forces lead to sufficiently high removal forces or removal strengths of the connection site.

Advantageously the joining part is inserted by using a punch and a die. It was shown that a diameter of the shaft region of the joining element smaller than 4 mm, in particular smaller than 3.5 mm, makes it possible to use dies with a diameter of 12 mm or less, in particular less than 10 mm, in the region of the joining zone so that such a die can be used in narrow regions of joining zones, for example in vehicle body flanges.

Advantageously the joining element is made of a material that is harder than the harder one of the two joining parts to be joined.

The method according to the invention is suited for joining two joining parts made of the same or different materials. For example the joining part 1 and the joining part 2 can be made of different plastic materials. On the other hand it is also possible that one of the two joining parts is made of plastic and the other one of the two joining parts is made of a metal. The method according to the invention can also be used for joining parts that are made of different metallic materials.

For further improving the joint connection produced with the method according to the invention it is also advantageous to make the joining element from a material that has a higher thermal expansion coefficient α than the greatest thermal expansion coefficient α of the joining parts to be joined.

It can also be advantageous to heat the joining zone, i.e., a partial region of the joining site into which the joining element is to be pushed, prior to performing the joining method according to the invention. Such heating can for example be accomplished with appropriate heating devices in a down holder or a die. When at least one of the joining parts is made of an inductively heatable metal, the joining part made of metal can for example be locally heated by inductive heating prior to pressing the joining part in. For the inductive heating, induction coils can be present in the down holder and/or the die.

As a result the joining parts have a higher temperature than the joining element prior to pressing the joining element, thereby enabling increasing the radial forces acting on the outer surface of the shaft of the joining element after insertion of the joining element. This results in a higher removal strength because the increased radial forces also result in an increased friction force between the joining parts and the joining element, which in turn results in the force fit/friction fit intended according to the invention while avoiding a form fit.

For further increasing the strength or for achieving a tight flange connection it can be advantageous to generate or at least prepare an adhesive connection between the joining parts, in particular in the region of the joining flanges, prior to performing the joining method according to the invention. The term preparing an adhesive connection for example means to apply an adhesive that is cured in a later step.

BRIEF DESCRIPTION OF THE DRAWING

In the following the invention is explained in more detail by way of the drawings.

It is shown in.

DETAILED DESCRIPTION OF PREFERRED EMBODIMENTS

Figure 1:
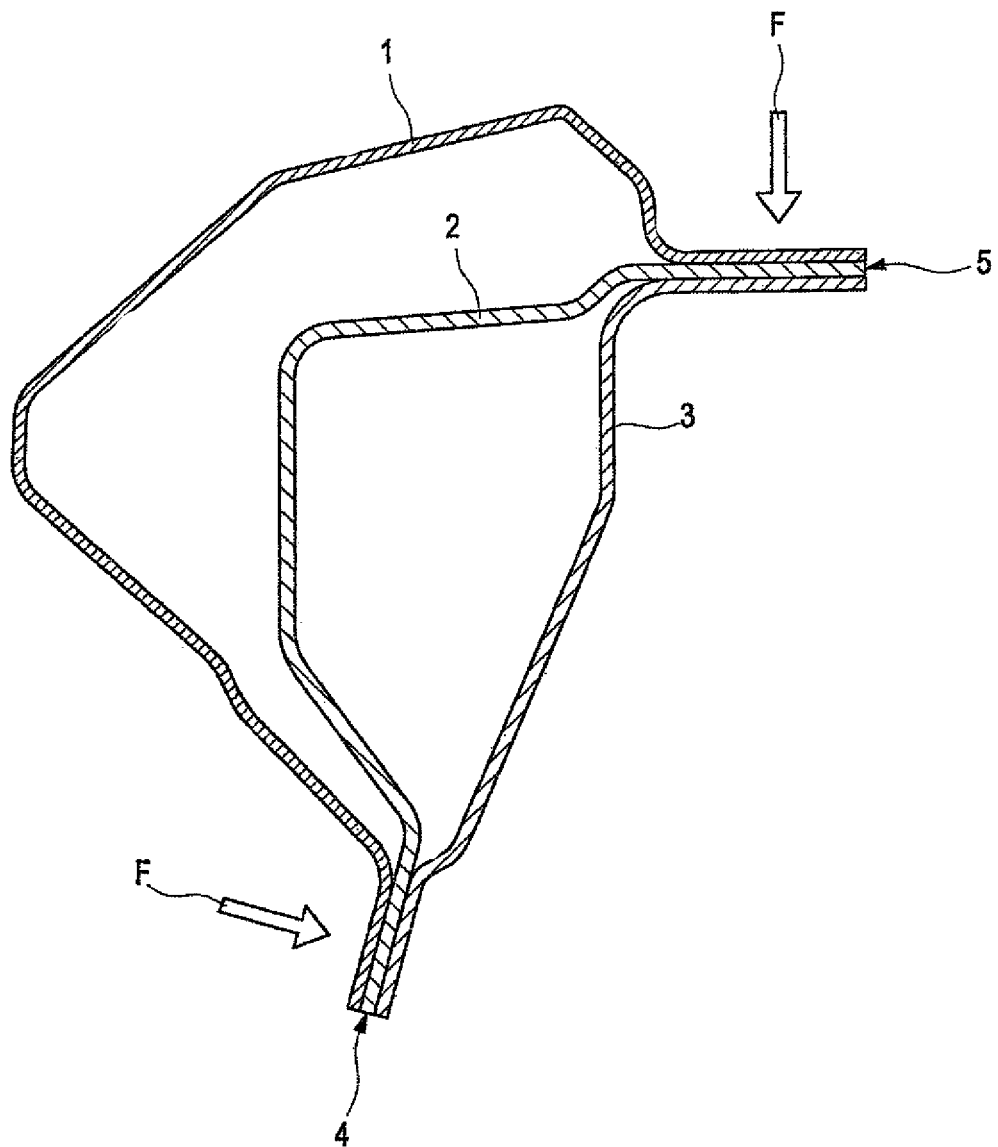
FIG. 1: a cross section through a joining part arrangement, which is to be joined with the method according to the invention.

FIG. 1 shows an exemplary joining part arrangement, which is suitable for the joining method according to the invention. The joining part arrangement has a first joining part 1, a second joining part 2 and optionally a third joining part 3. The joining parts 1, 2, 3 for example form a first joining flange 4 and a second joining flange 5. In the region of the joining flanges 4 and 5, joining elements are inserted with the joining method according to the invention for example in joining directions F. the joining directions F are hereby preferably perpendicular to the joining flanges 4, 5. In the shown example according to FIG. 1, the second and the third joining parts 2, 3 are for example made of a metal material, wherein the second and the third joining part 2, 3 in the region of the joining flanges 4, 5 are connected with each other by means of spot welding. With the method according to the invention the first joining part 1 is to be connected in the region of the joining flanges 4, 5 with the already joined second and third joining part 2, 3. The first joining part 1 can hereby also be made of a steel material or a different metal material for example aluminum or plastic.

Figure 2:
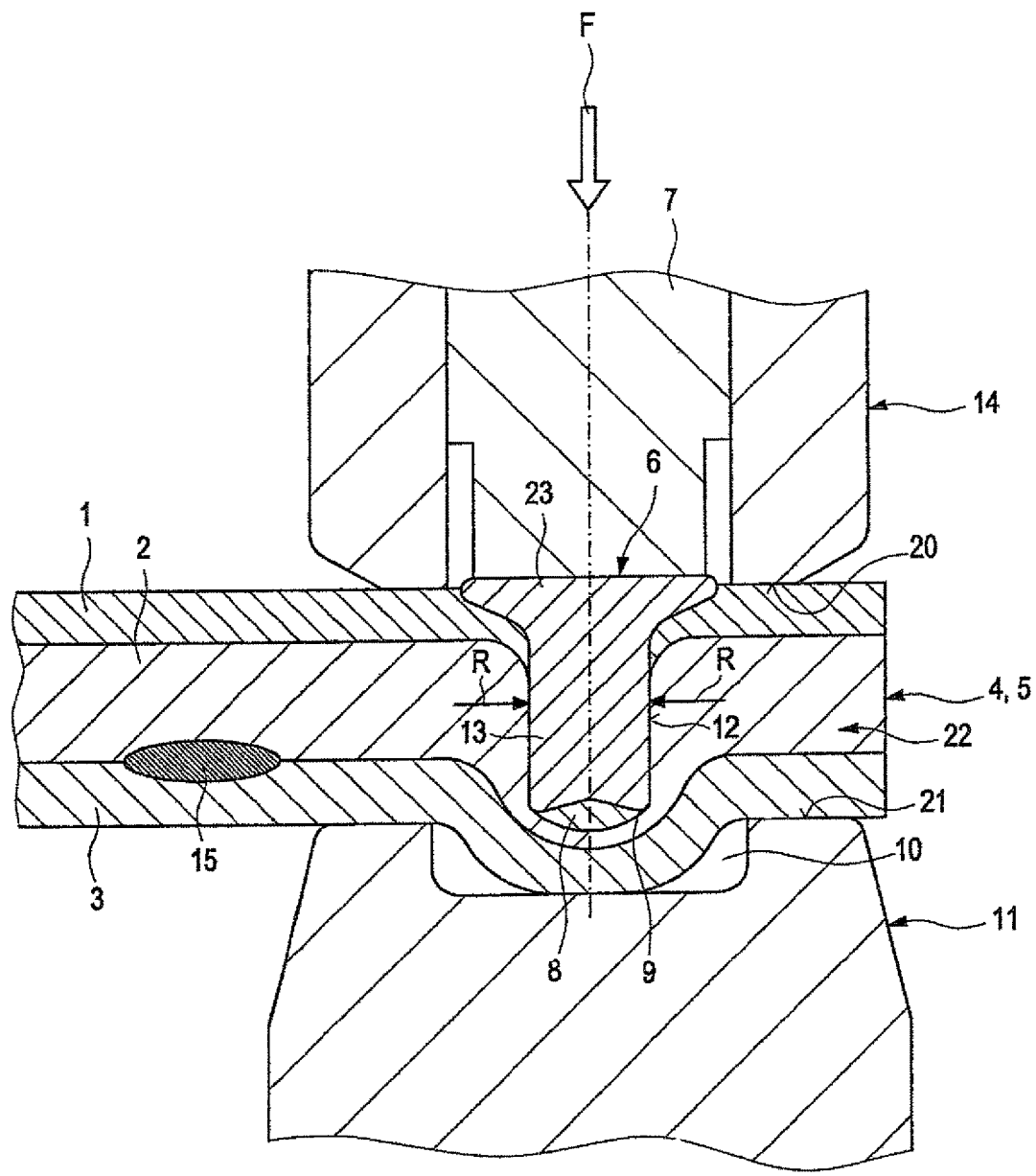
FIG. 2: a schematic section through a flange region of joining parts to be joined in the region of a joining zone with a joining element inserted according to the method according to the invention

In the following the method according to the invention is exemplary explained by way of FIG. 2, wherein FIG. 2 shows a joining flange 4, 5 into which a joining element 6 is inserted. The joining element 6 was pressed into the joining flange 4, 5 by means of a punch 7 along the joining direction F. During the pressing in of the joining element 6 along the joining direction F the joining element 6 first comes into contact with the first joining part 1. Further movement of the punch 7 causes the first joining part 1 to be punched through so that a slug 8 is generated. The slug 8 together with a terminal free end 9 of the joining element 6 is pressed onto the second joining part 2 in joining direction F, wherein—importantly—the second joining part 2 is not completely punched through but is only partially deformed in the joining direction F. As a result the slug 8 is embedded between the joining element 6, in particular the free end 9, and the non-punched through remainder of the second joining part 2. When a third joining part 3 is involved in the formation of the joining flange 4, 5, the third joining part is locally deformed optionally in a recess region 10 of the die 11 by urging in the joining element 6 in the joining direction F. Surprisingly, urging in the joining element 6 in joining direction F results in radial forces R that are sufficient to interact with an outer surface 12 of a shaft 13 of the joining element 6. Due to these radial forces friction forces R are generated that act in opposition to pulling the joining element 6 out of the joining parts 1, 2 against the joining direction F. These friction forces are sufficient to achieve a sufficient removal force at which the joining parts would be released from each other. Advantageously a down holder 14 can be arranged which surrounds the die 7, wherein of course after insertion of the joining element 6 into the joining flange 4, 5 the die 7 as well as the down holder 14 and also the die 11 are removed again. In case of a three-layered construction of the joining flange 4, 5 as shown in FIG. 2 it may be advantageous to connect the joining parts 2 and 3 to each other already prior to the insertion of the joining element 6. For example spot welding may be used for this purpose, which is schematically indicated by a spot welding lens 15. The down holder 14 and the die 11 each have contact surfaces 20 or 21 which are in contact with the joining flanges 4, 5 during insertion of the joining element 6 in the region of a joining zone 22. Via these contact surfaces 20, 21 heat may be introduced into the joining zone if desired. For this purpose it may be advantages to heat the down holder 14 and the die 11 in the region of the contact surfaces 20, 21 by means of heating devices (not shown).

As a result the joining element 6 sits after performance of the joining method according to the invention undercut-free and at least viewed in joining direction F in the absence of a form fit with its shaft 13 in the joining parts 1, 2.

Figure 3:
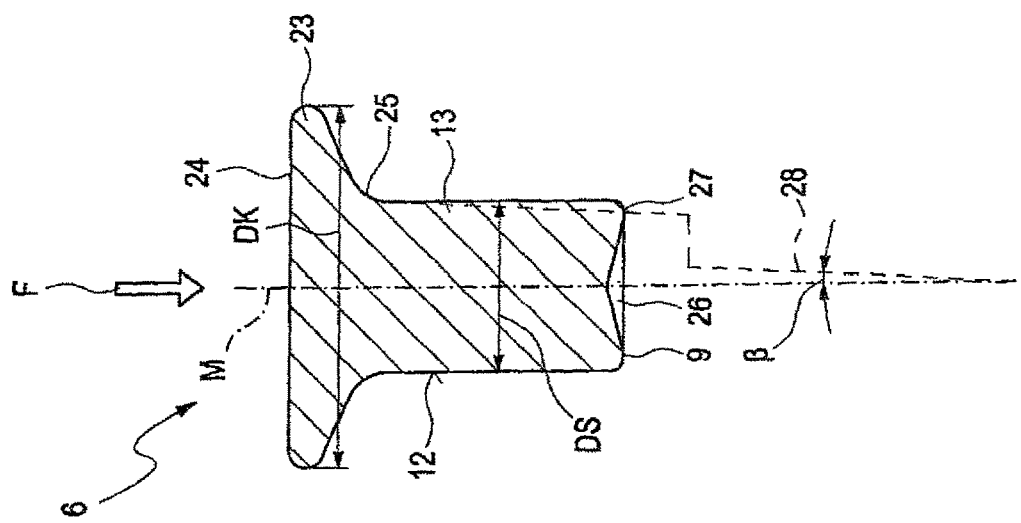
FIGS. 3a to 3c: a perspective view, a side view and a sectional view of a joining element provided for the method according to the invention.
Figure 3:
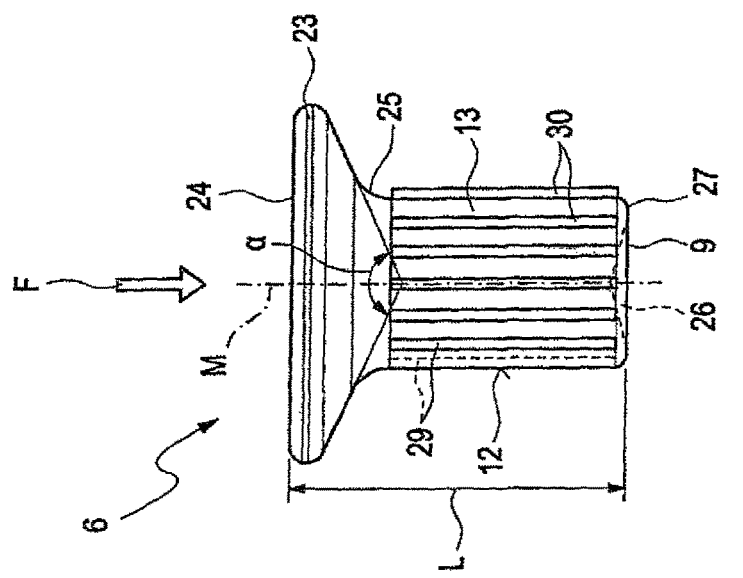
Figure 3:
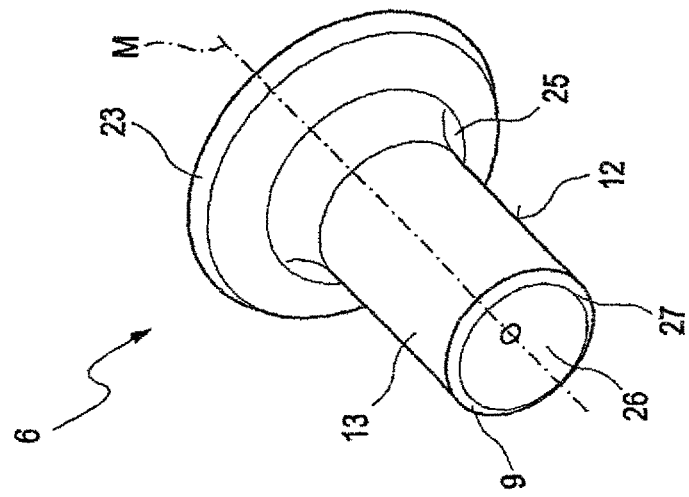

An appropriate joining element 6 for the method according to the invention is shown in FIGS. 3a to 3c. Such a joining element 6 has a shaft 13 and a head 23. During the joining process the outside 24 the head 23 interacts with the punch 7. Relative to the outside 24 the head of the joining element 6 tapers relative to the outside 2,4 preferably with an angle α>120°, and transitions into the shaft 13 via a radius region 25. At the face of its free end 9 the shaft 13 has a flat indentation 26 which when viewed in longitudinal extent L of the joining element 6 extends away from the free end 9 by a small degree, preferably by less than ⅕, preferably by less than ⅒ of the longitudinal extent L. As an alternative also an even end face can be used.

The joining element 6 is in the example according to the FIGS. 3a to 3c configured as rotationally symmetric component wherein the indentation 26 is configured tapered. The indentation 26 extends in radial direction viewed from a center axis M of the joining element 6 up until almost to the outer surface 12 of the shaft 13 so that a circumferential centering edge 27 is formed. The centering edge 27 causes a decrease of the tilting tendency during placement of the joining element 6 onto the joining part 1, before the joining element 6 is pressed in and supports the through punching of the first joining part 1 by means of the joining element 6. The outer ≤surface 12 of the shaft 13 has preferably a surface roughness $R_a$ of 10 μm or less. With the exception of the indentation 26 the joining element 6 is configured as a solid part (see FIG. 3c) so that a change of the three-dimensional shape of the joining element 6 during joining, in particular with the exception except of a minimal change of the outer surface 12 of the shaft 13 (i.e., scorings or grooves) does not occur.

Advantageously the joining element 6 has at least in the region of the shaft 13 a coating, for example a mixture of zinc, aluminum or nickel. When the joining element has a coating the coating has, at least in the region of the shaft 13, a surface roughness $R_a$ of ≤10 μm.

A further function of the indention 26 is to at least partially receive the generated slug 8 and guiding the slug 8 during entering the second form part 2.

In the exemplary embodiment 3a to 3c the shaft 13 of the joining element 6 is cylindrical, in any case undercut-free. The material for the joining element 6 is preferably selected so that for the joining element 6 a material is used that is harder than the hardest of the two joining parts 1, 2 to be joined. Advantageously the thermal expansion coefficient α of the joining element 6 is greater than the greatest thermal expansion coefficient α of the parts 1, 2, to be joined.

The term "undercut-free" in the context of the invention also includes three-dimensional shapes of the shaft 13, which taper undercut-free toward the free end 9. Thus the shaft 13 can for example be configured as a truncated cone, wherein center lines 28 of the outer surface 12 intersect at an acute angle β of a few degrees, in particular less than 3 to 5°, with the center line M (shown with dashed lines in FIG. 3c). The choice of the angle b is mostly based on a friction coefficient between the outer surface 12 and the joining parts 1, 2 and is selected by a person with skill in the art so that sufficient removal forces can be achieved in the joint generated by the method according to the invention.

For flange connections that are common in the construction of vehicle bodies a diameter of the shaft 13 of the joining element 6 of less than 4 mm, in particular less than 3.5 mm, has proven advantageous. In the case of a shaft 13 that tapers toward the free end 9, the greatest diameter of the shaft 13 is designated DS, which prevails directly at the transition to the radius region 25.

A diameter DK of the head 23 of the joining element is preferably 1.5 to 2 times the diameter DS of the shaft 13.

The joining element 6 is in particular made of high-strength tempered steel or of a material, which has a hardness of at least 520 HV, preferably 540 HV to 650 HV. The shaft 13 may in the region of the free end 9 be configured to have a stronger taper for example with a chamfer or a transition radius.

The above stated hardness values of the joining element 6 preferable apply to the joining of high-strength vehicle body panels. When for example a first and a second joining part 1, 2 are connected with the method according to the invention which are made of a soft material, for example plastic or aluminum, of course joining elements 6 with a lower hardness may be used. In particular for joining materials other than steel it may be useful to use a non-coated joining element 6, for example made of a so-called stainless steel.

For increasing the surface of the outside 24 of the shaft 13 that takes part in forming the force fit and/or friction fit, groove like indentations 29 and/or rib like elevations 30 can be provided. The groove like indentions 29 and/or rib like elevations 30 extend hereby parallel to the longitudinal extent, i.e., parallel to the center axis M, of the joining element 6 which is synonymous with a parallel direction relative to the joining direction F.

The method according to the invention advantageously achieves generating a simply producible and especially with regard to preventing entrance of humidity optimized joining connection. The reason herefore is that at least one outer joining part is not punched through so that this joining part, in the example of FIG. 2 the joining part 2, is not perforated and thus remains protected against moisture. Further the method according to the invention can be performed cost-effectively because a pre punching of the joining part 1 in the region of the joining zone 22 is not required. On the other hand the slug generated during the punching through the joining part 1 by means of the joining element 6 is embedded in the joining part 2 so that disposal of the slug 8 and separation of materials of the slug form other slug 8 is not required.

A further particular advantages is that the method according to the invention enables using particularly small joining elements 6 for example with a shaft diameter of only maximally 4 mm which allows keeping an outer diameter of the joining auxiliary tools (die 11 and down holder 14) small. This makes it possible that the method according to the invention can also be used for particularly short joining flanges 4, 5 with flange lengths of less than 15 mm, in particular 12 mm or less.

The method according to the invention is particularly suited for connecting sheet metal joining parts 1 to be punched through which have a thickness of 0.5 mm to 1.5 mm, in particular 0.8 mm to 1.2 mm joining part thickness. Furthermore sheet metal joining parts 2 into which the slug 8 are embedded, can have a thickness of 1.5 mm to 6 mm. hereby the thicknesses of the joining parts 1, 2 to be joined can be the same or different. Preferably the thicker one of the two joining parts (in the exemplary embodiment the joining part 2) is the one, which serves for receiving the slug 8 and which is not punched through.

What is claimed is:

1. A method for joining two joining parts, said method comprising:
   moving a solid joining element in a joining direction against one of the at least two joining parts in an overlapping joining zone with the other one of the two joining parts until the joining element penetrates through the one of the at least two joining parts and thereby separates a slug from the one of the at least two joining parts; and
   continuing to move the joining element in the joining direction until pressing against the other one of the joining parts and thereby embed the slug between an end face of a free end of the joining element and the other one of the joining parts, without deformation of the joining element, thereby generating on the joining element a radial force resulting in a friction force sufficient to secure the joining element in place and to oppose a withdrawal of the joining element in a direction opposite to the joining direction.

2. The method of claim 1, wherein the joining element further has a head, and wherein the shaft has an outer surface which is one of oval, triangular quadrangular and polygonal when viewed in cross section.

3. The method of claim 1, wherein the shaft of the joining element is configured to taper toward a free end of the shaft.

4. The method of claim 1, wherein the joining element in the region of the outer surface has a surface roughness Ra of ≤10 µm.

5. The method of claim 1, wherein the joining element is inserted by using a punch and a die.

6. The method of claim 5, wherein an outer diameter of the die that contacts the second joining part in the region of the joining zone is less than 12 mm, or a diameter of a shaft of the joining element is smaller than 4 mm, in particular smaller than 3.5 mm.

7. The method of claim 6, wherein the outer diameter of the die that contacts the second joining part in the region of the joining zone is less than 10 mm.

8. The method of claim 6, wherein the diameter of the shaft of the joining element is smaller than 3.5 mm.

9. The method of claim 5, further comprising a down holder arranged opposite the die.

10. The method of claim 1, wherein the joining element is made of a material which is harder than a hardest one of the at least two joining parts.

11. The method of claim 1, wherein the first joining part and the second joining part are made of different materials.

12. The method of claim 1, wherein at least one of the first and second joining parts is made of plastic or a metal.

13. The method of claim 1, wherein the joining element has a thermal expansion coefficient which is greater than a greatest thermal expansion coefficient of the at least two joining parts.

14. The method of claim 1, further comprising heating at least one of the at least two joining parts in a region of the joining zone, so that at least the at least two joining parts have a higher temperature than the joining element in the region of the joining zone.

15. The method of claim 1, wherein the down holder and/or the die comprise induction coils arranged in down holder and/or the die for inductive heating of the joining zone.

16. The method of claim 1, wherein prior to the joining the joining element has a lower temperature compared to one of the at least two joining parts.

17. The method of claim 16, wherein prior to the joining the joining element has a temperature that is colder by at least 30 K at least the one of the at least two joining parts.

18. The method of claim 1, further comprising prior to the joining of the at least two joining parts generating or preparing an adhesive connection.

19. The method of claim 1, further comprising forming a shaft region of the joining element with groove-shaped indentations or rib-shaped elevations extending parallel to the joining direction to increase a surface area of the joining element.

20. The method of claim 1, wherein the joining element sits without an undercut at least in a shaft region of the joining element, when the joining element is in place for joining the joining parts.

* * * * *

UNITED STATES PATENT AND TRADEMARK OFFICE
CERTIFICATE OF CORRECTION

PATENT NO. : 10,239,115 B2
APPLICATION NO. : 15/112075
DATED : March 26, 2019
INVENTOR(S) : Norbert Hornbostel, Frank Barkhausen and Heiko Hellmeier It is certified that error appears in the above-identified patent and that said Letters Patent is hereby corrected as shown below:

On the Title Page

Page 2, Column 2 [56] FOREIGN PATENT DOCUMENTS: correct the listed Chinese patent document "CN 02728766" to read --CN 102728766--.

In the Claims

In Column 8, Claim 6, Line 13-14: after "4 mm" delete ", in particular smaller than 3.5 mm".

Signed and Sealed this
Fourth Day of June, 2019

Andrei Iancu
*Director of the United States Patent and Trademark Office*